(12) United States Patent
Wheelwright (10) Patent No.: US 6,439,160 B1
(45) Date of Patent: Aug. 27, 2002

(54) PAW CLEANING APPARATUS FOR ANIMALS

(76) Inventor: Troy L. Wheelwright, 16 Brandon Rd., Haverhill, MA (US) 01832

( * ) Notice: Subject to any disclaimer, the term of this patent is extended or adjusted under 35 U.S.C. 154(b) by 3 days.

(21) Appl. No.: 09/789,267

(22) Filed: Feb. 20, 2001

(51) Int. Cl.⁷ ............................................... A01K 29/00
(52) U.S. Cl. ........................................................ 119/165
(58) Field of Search ................................ 114/165, 170, 114/163, 673, 671, 664; 15/238, 237

(56) References Cited

U.S. PATENT DOCUMENTS

| | | | | |
|---|---|---|---|---|
| 3,023,734 A | * | 3/1962 | Schaub | 119/676 |
| 3,064,296 A | * | 11/1962 | Lidke | 15/161 |
| 4,313,238 A | * | 2/1982 | Harbin | 15/37 |
| 4,549,502 A | | 10/1985 | Namdari | |
| 4,577,624 A | | 3/1986 | Patton | |
| 4,836,144 A | | 6/1989 | Cole | |
| 5,213,064 A | | 5/1993 | Mondine et al. | |
| 5,711,252 A | | 1/1998 | Brandolino | |
| 5,842,442 A | | 12/1998 | Marr | |
| 5,845,604 A | | 12/1998 | Cucchi et al. | |
| 6,050,223 A | * | 4/2000 | Harris | 119/165 |
| 6,135,057 A | * | 10/2000 | Cummings | 119/165 |
| 6,205,953 B1 | * | 3/2001 | Ginn | 119/165 |
| 6,219,873 B1 | * | 4/2001 | Keuchel | 15/161 |
| 6,237,534 B1 | * | 5/2002 | Schwartz | 119/165 |

* cited by examiner

Primary Examiner—Peter M. Poon
Assistant Examiner—Kevin Jakel
(74) Attorney, Agent, or Firm—Dale J. Ream (57) ABSTRACT

A paw cleaning apparatus includes a basin for holding a cleaning liquid, the basin having end and side walls extending upwardly from an inclined inner bottom wall. A grate is supported on ledge portions on the side walls above the inner bottom wall and is constructed to support an animal thereon. Spaced apart arms of a support rack are supported on additional ledge portions on the side walls intermediate the grate and inner bottom wall. A brush head is coupled to the support rack and extends transversely between the rack arms, the brush head being selectably positioned longitudinally therealong. Bristles extend upwardly from the brush head and through the grate. A vibration device coupled to the rack causes the rack and brush head to reciprocate when energized. A water pump draws water from the basin and discharges it through the brush head for cleaning the paws of an animal positioned thereon.

20 Claims, 12 Drawing Sheets

PAW CLEANING APPARATUS FOR ANIMALS

BACKGROUND OF THE INVENTION

This invention relates generally to animal washing devices and, more particularly, to an apparatus having reciprocating brushes for cleaning the paws of an animal positioned thereon.

Washing a small pet such as a dog is a common, yet often dreaded, chore. Pet washing is often undertaken indoors using a conventional bathtub or outdoors using a tub or garden hose. However, a more frequently encountered need is to merely clean the dirty paws of an animal before the animal is permitted to come indoors. A complete washing of the animal is simply unnecessary and undesirable in this instance.

Various apparatus have been proposed in the prior art for the complete washing of a pet such as a dog. Existing devices, however, are not particularly adapted for the thorough cleaning of the paws of a pet. Therefore, it is desirable to have a paw cleaning apparatus which utilizes reciprocating brushes to clean the paws of an animal standing on a grated platform. Further, it is desirable to have a paw cleaning apparatus which discharges cleaning liquid from a basin through the brush heads so as to enhance the cleaning of the paws of a pet.

SUMMARY OF THE INVENTION

A paw cleaning apparatus according to the present invention includes a basin for receiving and holding a cleaning liquid. The basin includes sloped side walls and end walls extending upwardly from an inclined inner bottom wall. The inclined sides and bottom allow the cleaning liquid to pool at one end of the apparatus for drainage or recirculation purposes. A grate spans between the side and end walls within the basin and snappably rests atop ledge portions fixed along the side walls. The grate operates as a platform on which an animal may stand. The apparatus further includes a support rack having a pair of laterally spaced apart arms that may rest atop additional ledge portion fixed along the side portion between the grate ledge portions and the inner bottom wall. More particularly, a plurality of wheels axially connected to the rack arms rest atop the rack ledge portions such that the rack arms are slidable thereon.

At least a pair of brush assemblies are coupled to the rack arms, each brush assembly having a brush head that extends transversely between the rack arms and may be removably and selectably coupled thereto. Thus, the brush assemblies may be selectively positioned to accommodate the length of the pet whose paws are being cleaned. Bristles extend upwardly from each brush head and through the grate. The apparatus includes a vibration device having a piston which extends through an end wall of the basin and is connected to the rack. When the vibration device is energized, e.g. by A/C electrical power, the piston causes the rack and brush assemblies to reciprocate so as to clean the paws of the animal positioned over the brush assemblies.

The apparatus may also include a water pump having an open ended inlet tube positioned near the inner bottom wall of the basin for sucking or vacuuming cleaning liquid into the inlet tube and pump housing. The water pump then discharges the collected cleaning liquid through outlet tubes to the brush heads and ultimately through a plurality of orifices defined in the brush heads. This discharge helps to break up dirt or mud on the paws of the animal so it is more easily brushed therefrom. Alternatively, a high velocity air pump may be used for this purpose.

Therefore, a general object of this invention is to provide a cleaning apparatus for cleaning the paws of a pet.

Another object of this invention is to provide a cleaning apparatus, as aforesaid, which can clean the paws of a pet with reciprocating brushes.

Still another object of this invention is to provide a cleaning apparatus, as aforesaid, which includes a platform for supporting an animal and which is removable for cleaning.

Yet another object of this invention is to provide a cleaning apparatus, as aforesaid, in which the brushes may be repositioned for pets of various lengths.

A further object of this invention is to provide a cleaning apparatus, as aforesaid, having sloped sides and bottom such that a cleaning liquid may be collected from the basin and discharged through the brush heads.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A paw cleaning apparatus according to the present invention will now be described with reference to FIGS. 1 through 12b of the accompanying drawings.

Figure 1:
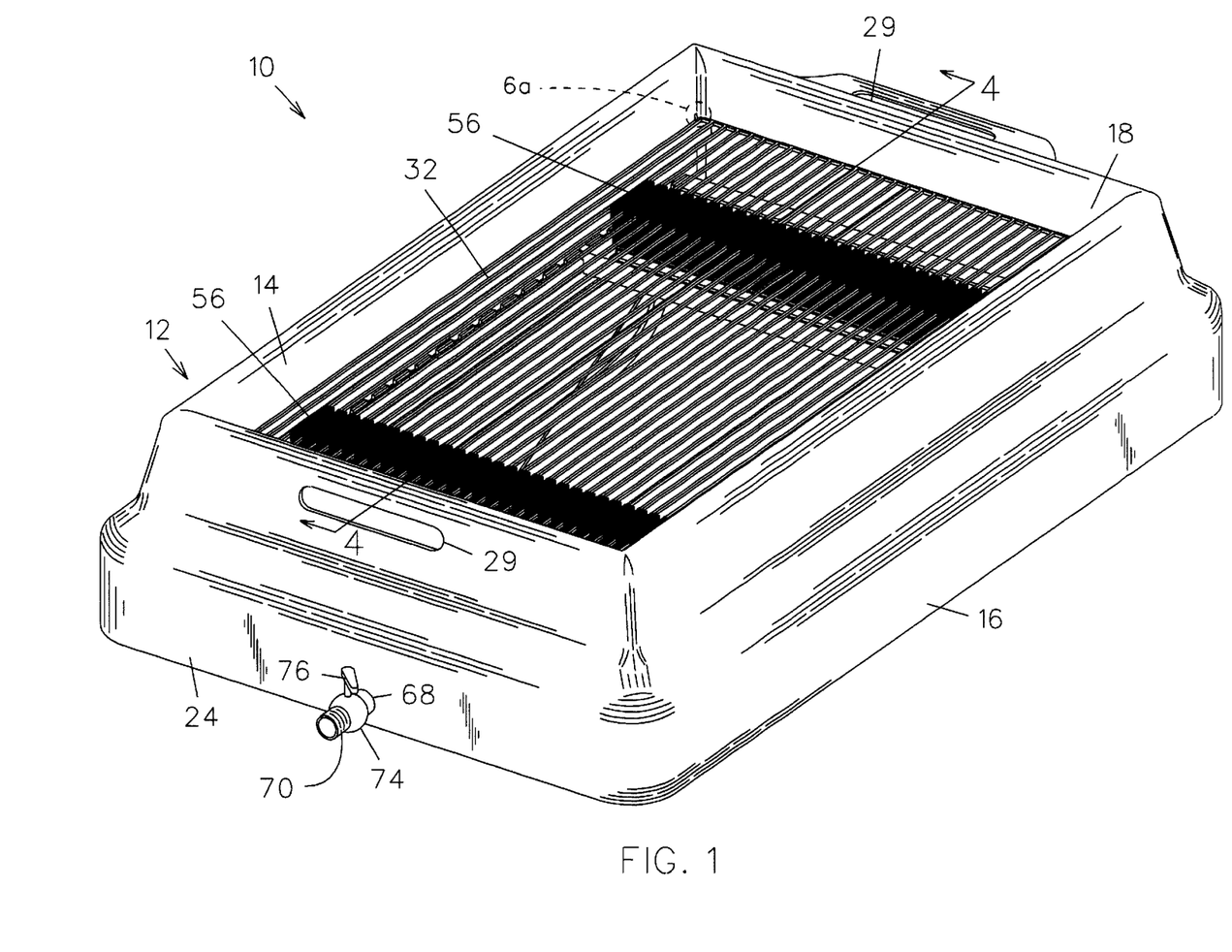
FIG. 1 is a perspective view of a paw cleaning apparatus according to an embodiment of the present invention.
Figure 4:
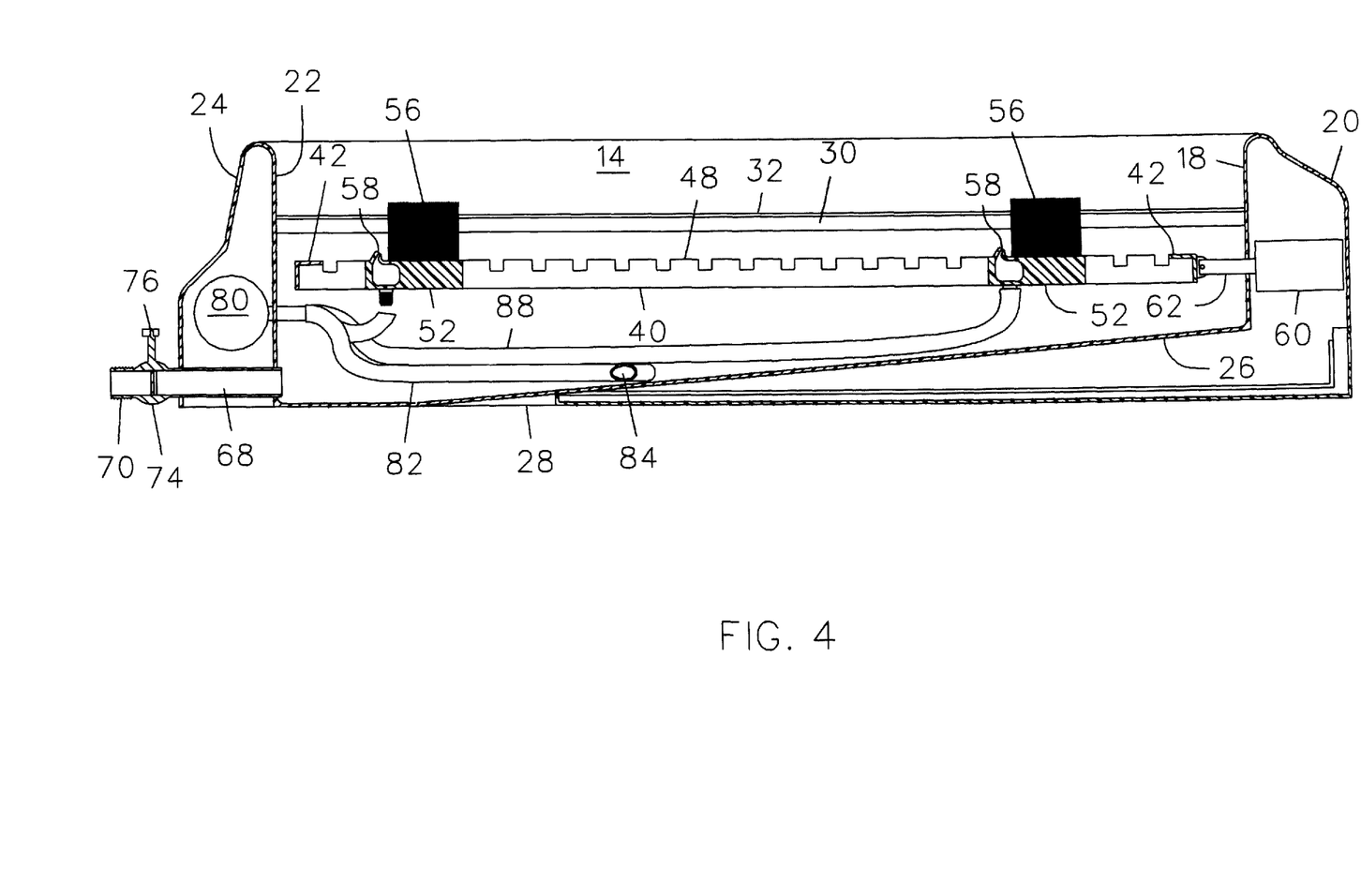
FIG. 4 is a sectional view taken along line 4—4 of FIG. 1.
Figure 5:
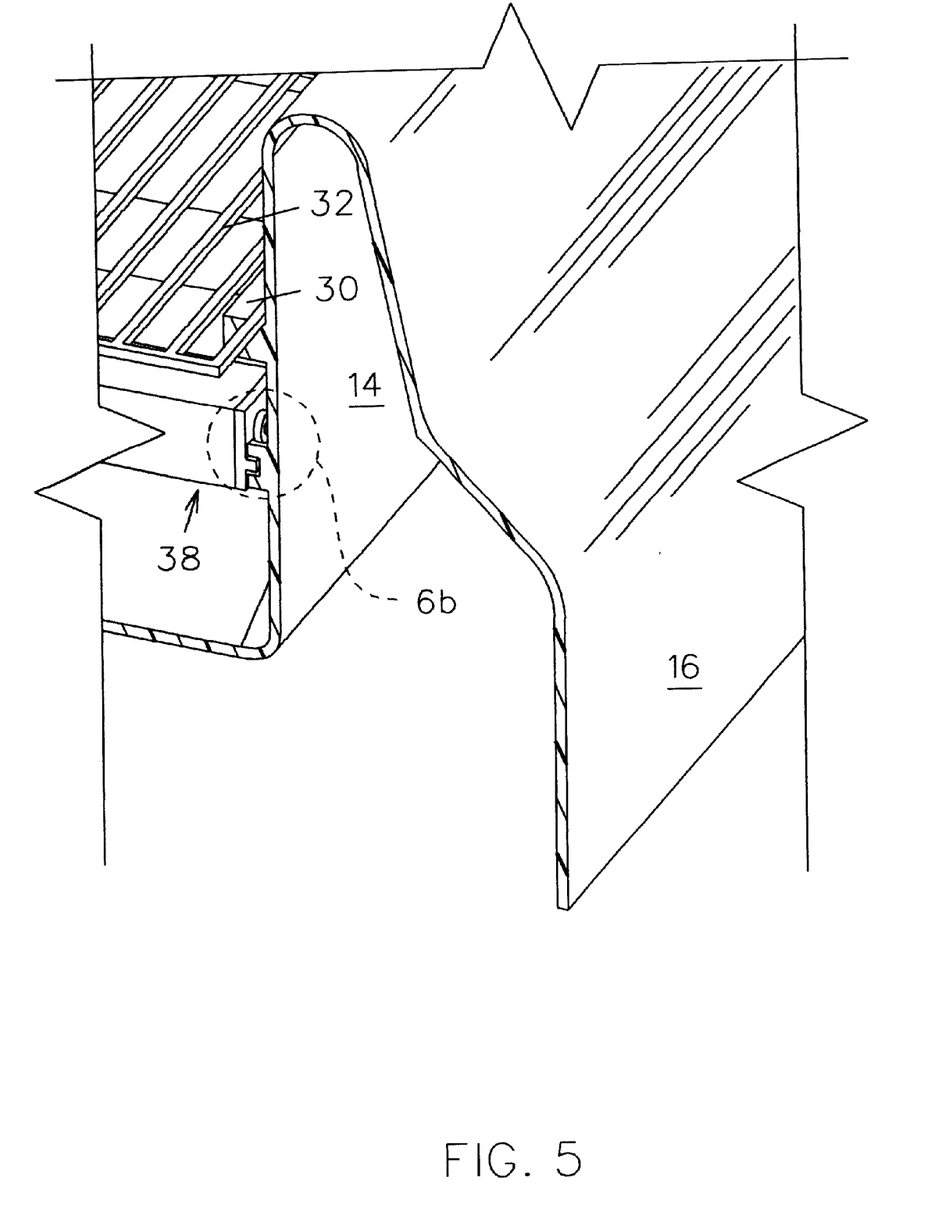
FIG. 5 is a fragmentary sectional view taken along line 5—5 of FIG. 3.

A paw cleaning apparatus 10 according to one embodiment of the present invention is shown in FIG. 1 and includes a generally rectangular basin 12. The basin 12 includes opposed inner side walls 14 and first 18 and second 22 inner end walls extending upwardly from a inner bottom wall 26. The side walls 14 are sloped inwardly in the direction of the inner bottom wall 26 while the inner bottom wall 26 itself is downwardly inclined between the first inner end wall 18 to the second inner end wall 22 (FIG. 4). The inner side and end walls define an open topped container capable of receiving and holding a cleaning liquid therein with the inclined configuration pooling the liquid toward the second inner end wall 22.

Figure 2:
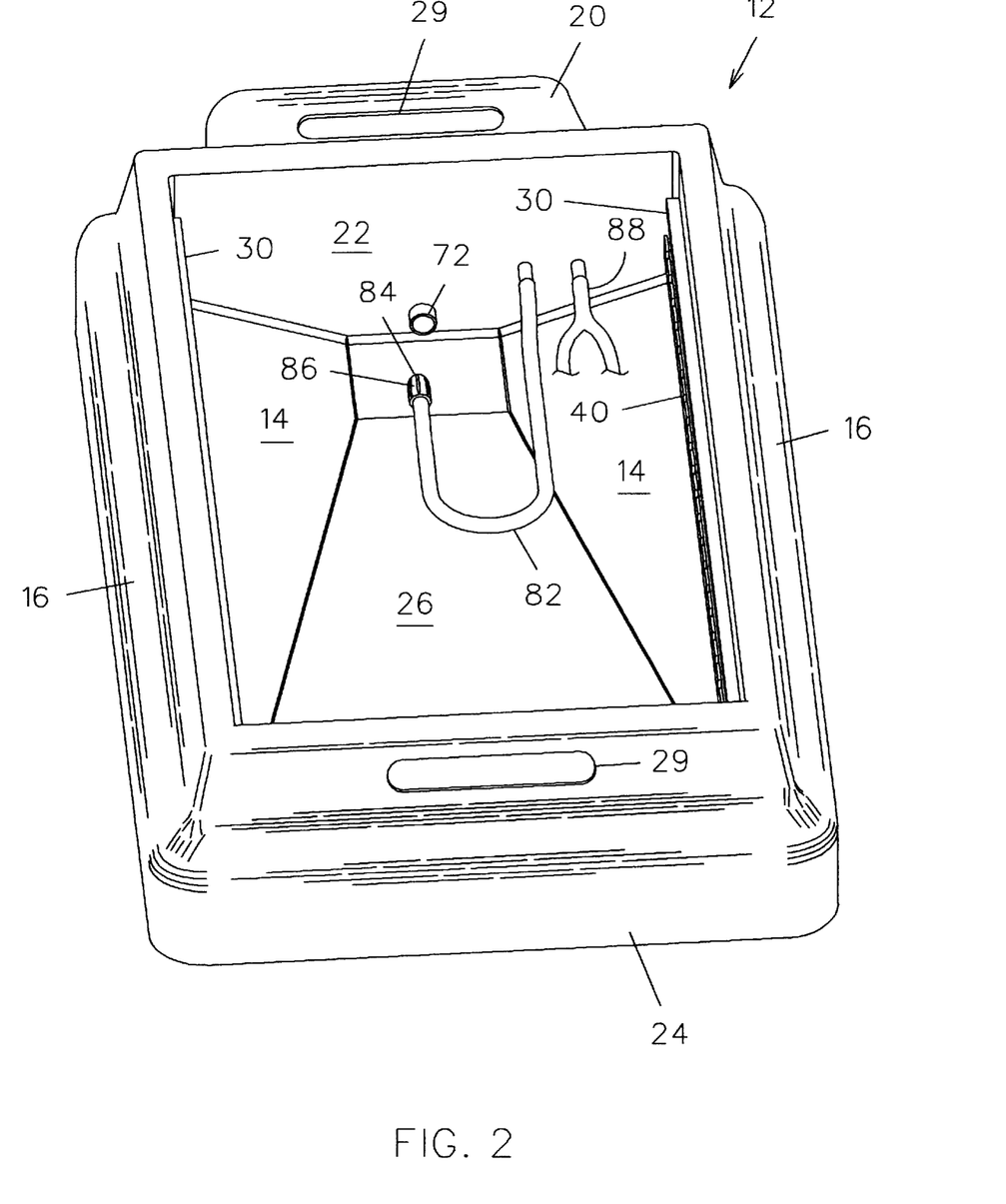
FIG. 2 is an elevated end view of the apparatus as in FIG. 1 with the grate and brush assemblies removed.
Figure 3:
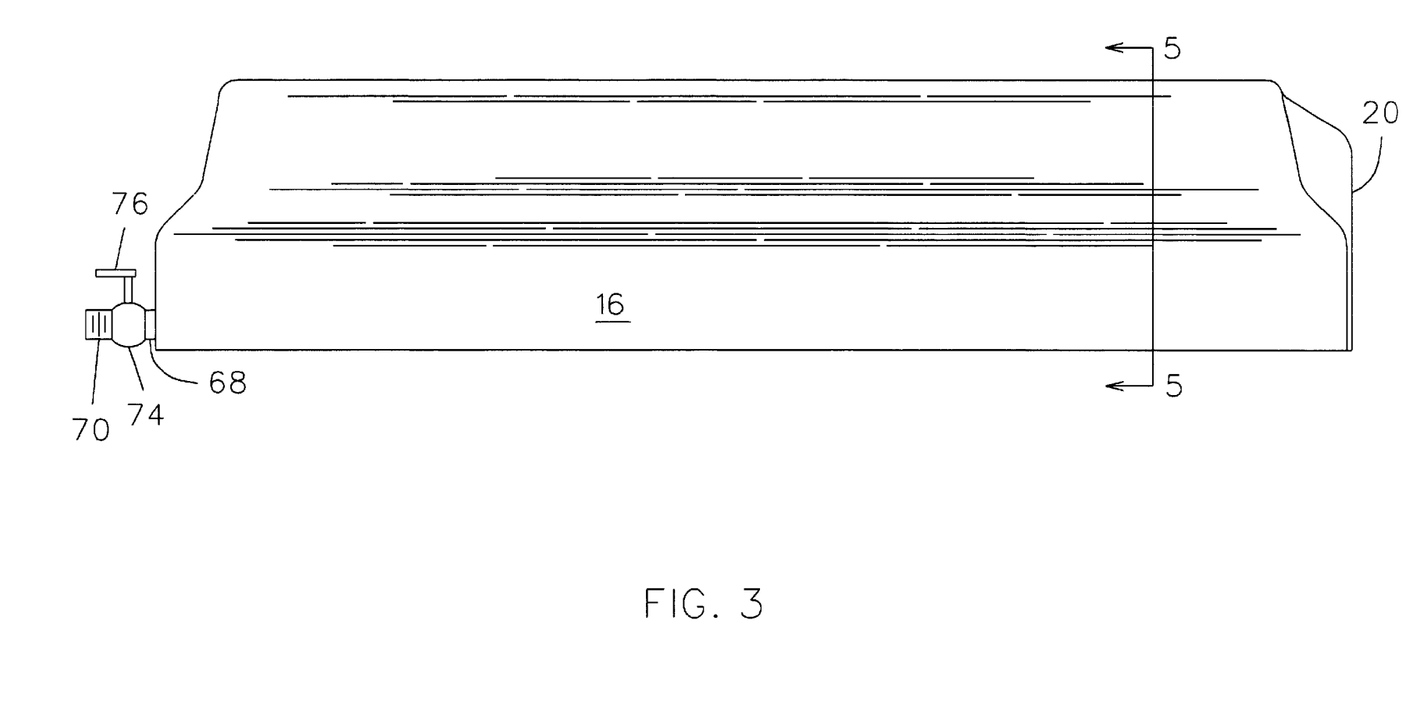
FIG. 3 is a side view of the apparatus as in FIG. 1.

The basin 12 further includes outer side walls 16 having upper edges integrally attached to corresponding upper edges of the inner side walls 14. The outer side walls 16 include a generally outward contoured configuration wherein lower edges thereof are spaced apart from the inner side walls 14 so as to provide a stable base construction (FIG. 2). Similarly, the basin includes first 20 and second 24 outer end walls integrally attached at upper edges to first 18 and second 22 inner end walls, respectively. Each outer end wall 20, 24 is generally outwardly contoured from the upper edges such that respective lower edges are spaced from respective inner end walls 18, 22 so as to form a stable base construction and to define an interior space between inner and outer end walls (FIG. 4). An outer bottom wall 28 connects the bottom edges of the outer side and end walls and spans between the outer side and end walls to enclose the basin 12 and provide a level base (FIG. 4). Each outer end wall 20, 24 defines a handle slot 29 such that the apparatus may be portably moved to a desired cleaning location or to a storage location (FIG. 2).

Figure 6A:
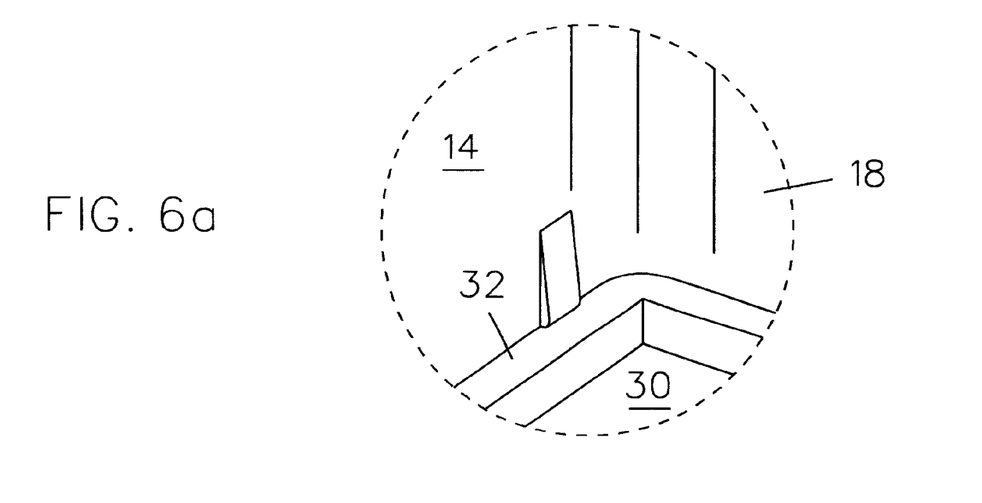
FIG. 6a is a perspective view on an enlarged scale of the grate attachment means as in FIG. 1.

The apparatus 10 further includes a pair of elongate grate ledge portions 30 fixedly attached to respective inner side walls 14 and extending longitudinally therealong. The grate ledge portions 30 are parallel to one another within an imaginary horizontal plane spaced above the inner bottom wall 26. The apparatus 10 includes a rectangular grate 32 configured to removably rest upon the grate ledge portions 30 in a snap-fit relationship, as shown in FIG. 6a. Therefore, an animal may be supported upon the grate 32.

Figure 6B:
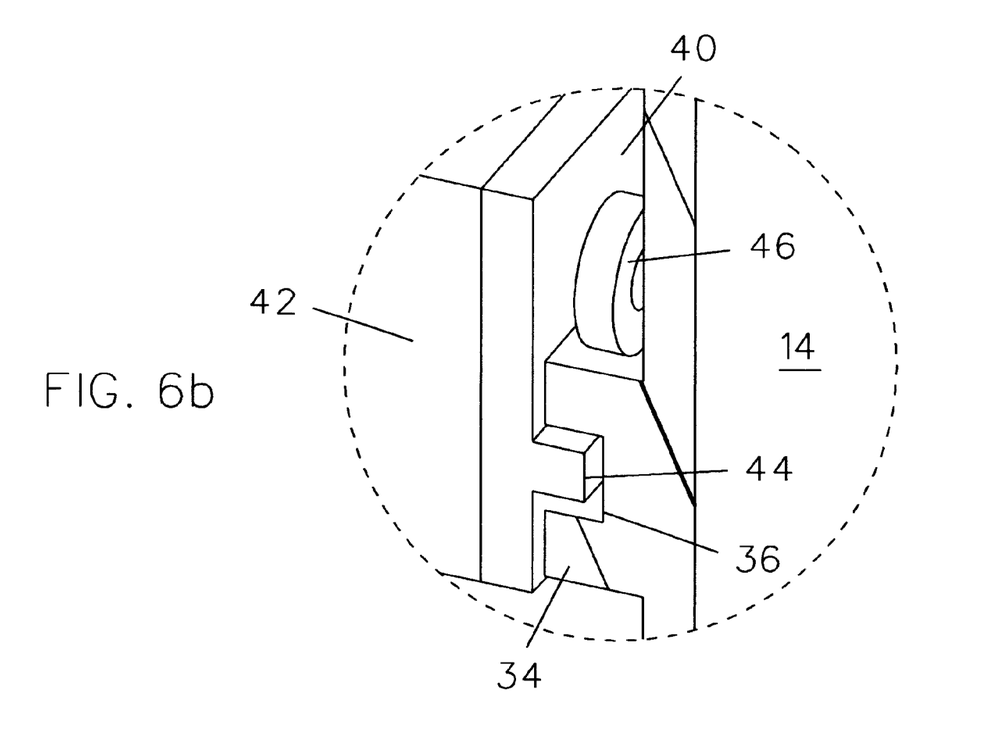
FIG. 6b is a perspective view on an enlarged scale of the means for slidably coupling the support rack to the basin as in FIG. 5.
Figure 7:
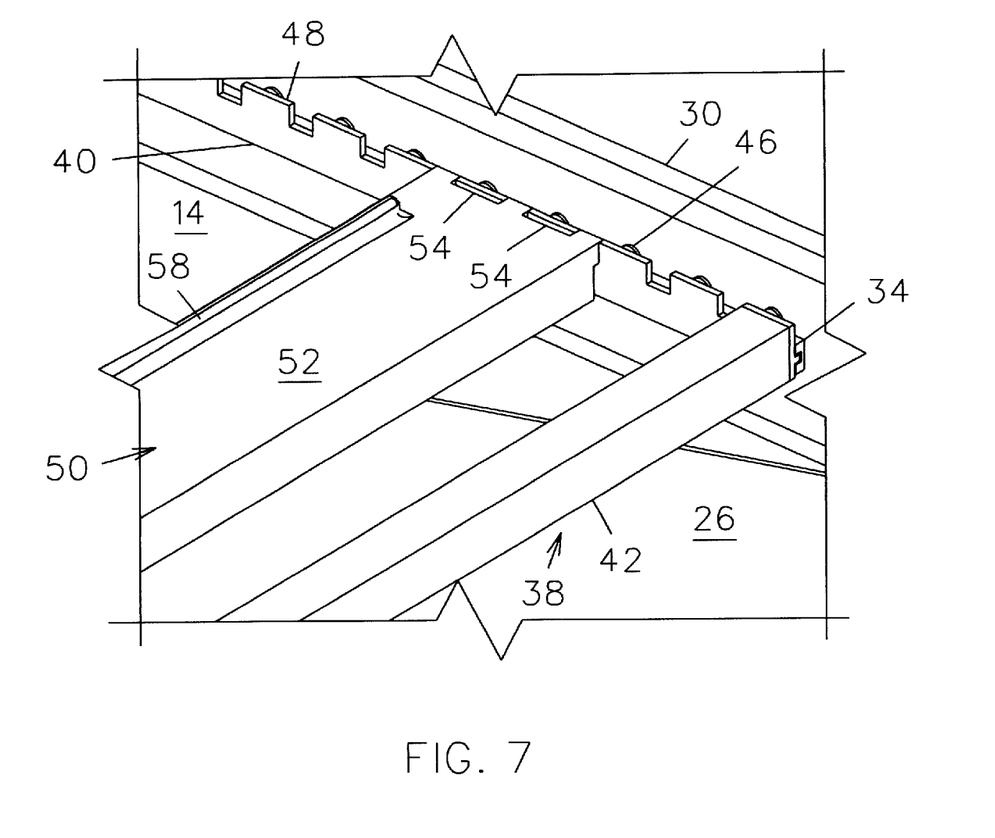
FIG. 7 is a fragmentary perspective view of a brush assembly coupled to the support rack with the bristles removed from the brush head.

The apparatus 10 further includes a pair of rack support ledge portions 34 fixedly attached to respective inner side walls 14 and extending longitudinally therealong. The rack support ledge portions 34 are positioned intermediate the grate ledge portions 30 and the inner bottom wall 26 of the basin 12. As best shown in FIG. 6b, each rack support ledge portion 34 defines a slot 36 in an inward face thereof that extends longitudinally along the respective portion. The apparatus 10 includes a brush assembly support rack 38 having a pair of laterally spaced apart arms 40 connected at terminal ends with an angle bar 42 (FIG. 7). Each rack arm 40 includes an elongate guide flange 44 extending longitudinally along an outer surface thereof, each guide flange 44 having a configuration complementary to a respective rack support ledge portion slot 36 for slidably mating therewith. Each rack arm 40 further includes a plurality of wheels 46 axially coupled to an outer surface, the wheels being positioned to rest atop a respective rack support ledge portion 34 for slidable movement thereon. Each rack arm 40 further includes a plurality of upwardly extending tabs 48 spaced apart from one another longitudinally therealong (FIG. 7).

Further, the apparatus 10 includes a pair of brush assemblies 50 coupled to the support rack, although a single brush assembly would also be suitable. Each brush assembly 50 includes a brush head 52 extending transversely between the arms 40 of the support rack 38 (FIG. 7). Longitudinal ends of each brush head 52 define apertures 54 having a configuration complementary to the configuration of the rack arm tabs 48 such that the brush head 52 may be removably coupled to the rack arms 40 at selective positions therealong.

Each brush head 52 also includes a plurality of upwardly extending bristles 56, the bristles 56 being of a length sufficient to extend through the grate 32 for contacting the paws of an animal positioned thereon, as to be described more fully below. It is understood that the bristles may be of uniform length or include both long and short bristles. Each brush head 52 also includes a plurality of sprayer orifices 58 positioned along an edge thereof.

A vibration device 60 is mounted within the interior space between the first inner 18 and outer 20 end walls. The vibration device 60 includes a piston 62 that extends through the first inner end wall 18 and is coupled to the support rack 38. The vibration device 60 includes a power cord 64 such that the piston 62 causes the support rack 38 to reciprocate when the power cord 64 is electrically connected to a power source, such as an A/C electrical outlet, and is actuated. The vibration device 60 is actuated upon operation of a traditional on/off switch 66.

A combination drain and fill tube 68 extends through the second inner 22 and outer 24 end walls, the tube 68 having a threaded end 70 that may be coupled to a faucet, garden hose, or the like for filling the basin 12 with water. An opposed end 72 defines an opening within the basin adjacent the inner bottom wall 26 for allowing a water stream to flow into the basin 12. A valve 74 controllable with a knob 76 or handle is coupled to the tube 68 adjacent the second outer end wall 24 for selectively allowing a water stream to flow in or out of the basin 12 (FIG. 2).

In this embodiment of the invention, a water pump 80 is mounted within the interior space between the second inner 22 and outer 24 end walls. The water pump 80 is connected to an inlet tube 82 defining an open inlet end 84 positioned adjacent the inner bottom wall 26 and adjacent the second inner end wall 22 (FIG. 2). The open inlet end 84 includes a filter 86 for removing impurities from cleaning liquid drawn into the inlet tube 82. The water pump 80 is also connected to an outlet tube 88 which divides into tube portions threadably coupled to the brush heads 52 of the brush assemblies 50 (FIGS. 2 and 4). The water pump 80 is electrically connected to the power cord 64 and is actuated upon actuation of the vibration device 60. Actuation of the water pump 80 draws cleaning liquid (e.g. water, soap and water, etc.) through the inlet tube 82 and discharges it to the brush heads 52 through the outlet tube 88. The discharged cleaning liquid is thus forced through the sprayer orifices 58 in the brush heads 52 so as to dislodge mud or dirt from the paws of an animal positioned thereon.

In use, the basin 12 may be filled with water or another cleaning liquid by pouring it directly into the open topped container or by coupling the fill tube 68 to a faucet or hose. The basin 12 is filled to a point such that the grate 32 and bristles 56 extending therethrough are slightly submerged. An animal whose paws are to be cleaned may then be positioned on the bristles 56 of the brush heads 52. With the electrical cord 64 being plugged in to an electrical outlet and the on/off switch 66 being operated to an "on" position, the vibration device 60 causes the piston 62 to reciprocate which, in turn, causes the support rack 38 and brush assemblies 50 to reciprocate. Energizing the vibration device 60 automatically energizes the water pump 80 such that cleaning liquid in the basin is discharged through the brush heads 52 as they reciprocate. This discharge helps to dislodge dried mud or other debris from an animal's paws such that such debris is more easily removed by the reciprocating brushes. It should be appreciated that the brush assemblies 50 may be removed from the support rack 38 for manually cleaning an animal's paws.

Figure 8:
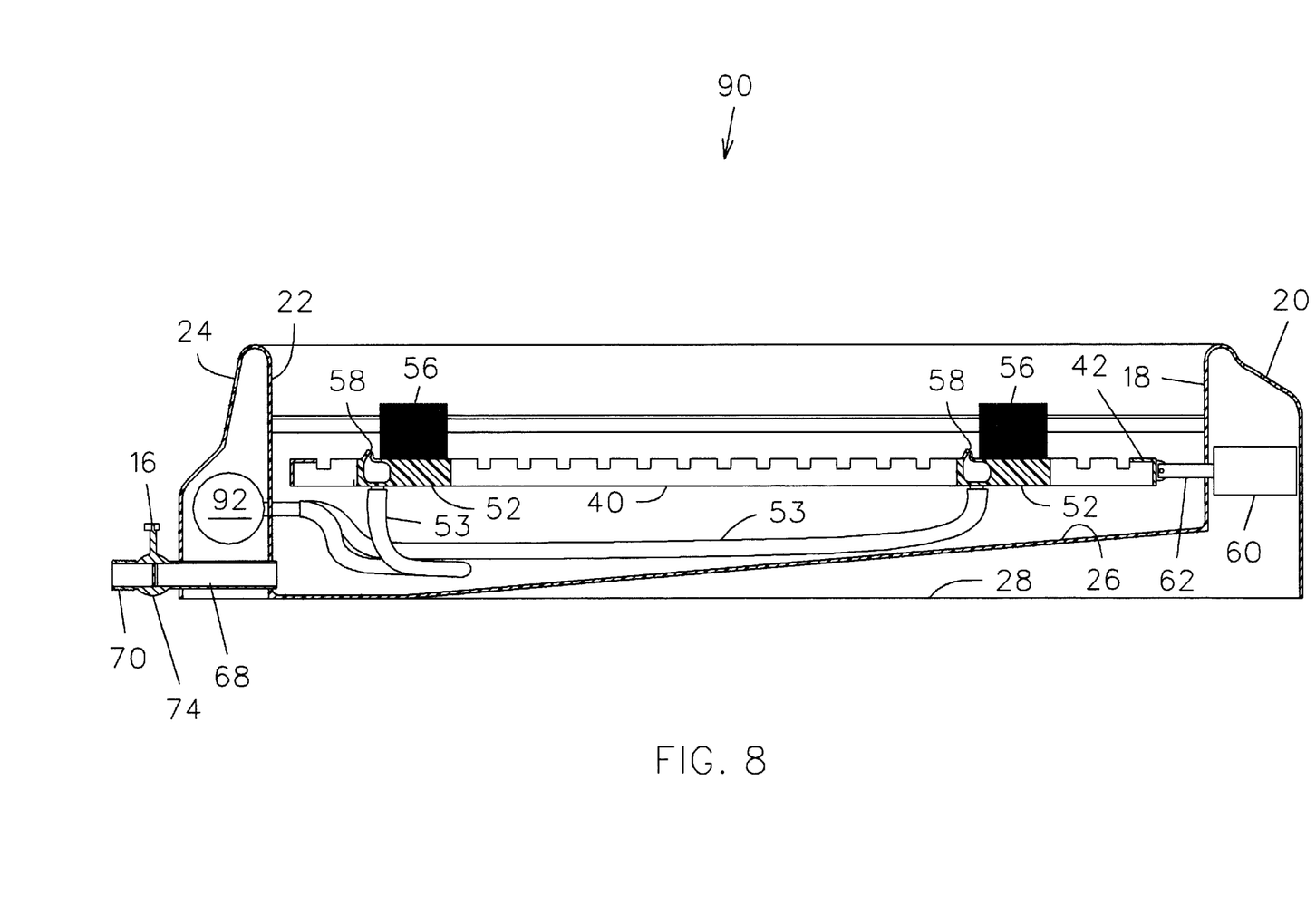
FIG. 8 is a sectional view of another embodiment of the paw cleaning apparatus.
Figure 9:
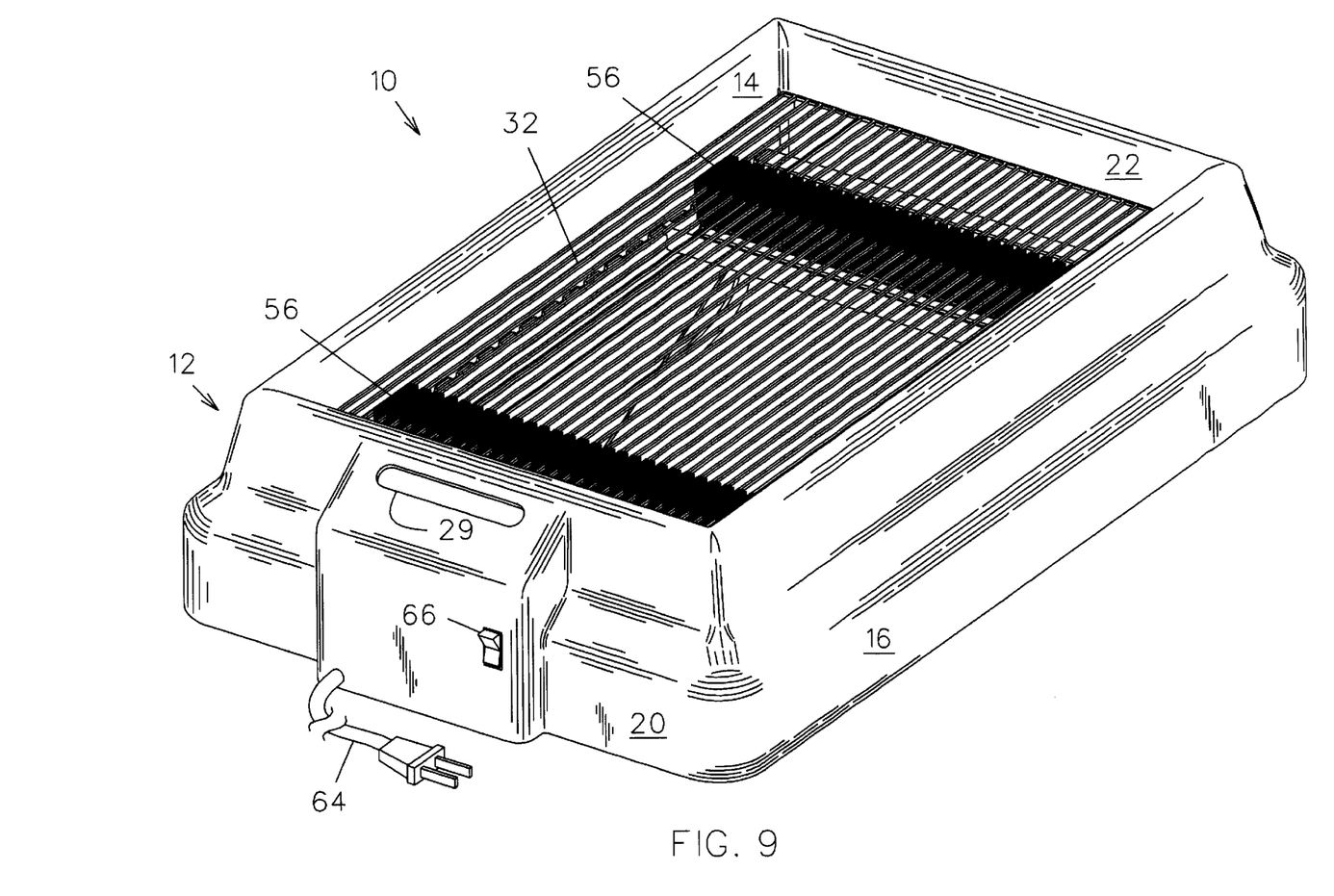
FIG. 9 is a perspective view from another angle of the apparatus as in FIG. 1.

Another embodiment 90 of the invention is shown in FIG. 8 and has a construction that is substantially similar to the embodiment described above except as particularly noted below. An air pump 92 replaces the water pump 80 and is connected to the brush heads 52 with outlet tubes 53, the air pump 92 forcing a stream of high velocity air through the brush heads so as to dislodge mud or debris from the paws of an animal positioned thereon.

Figure 10:
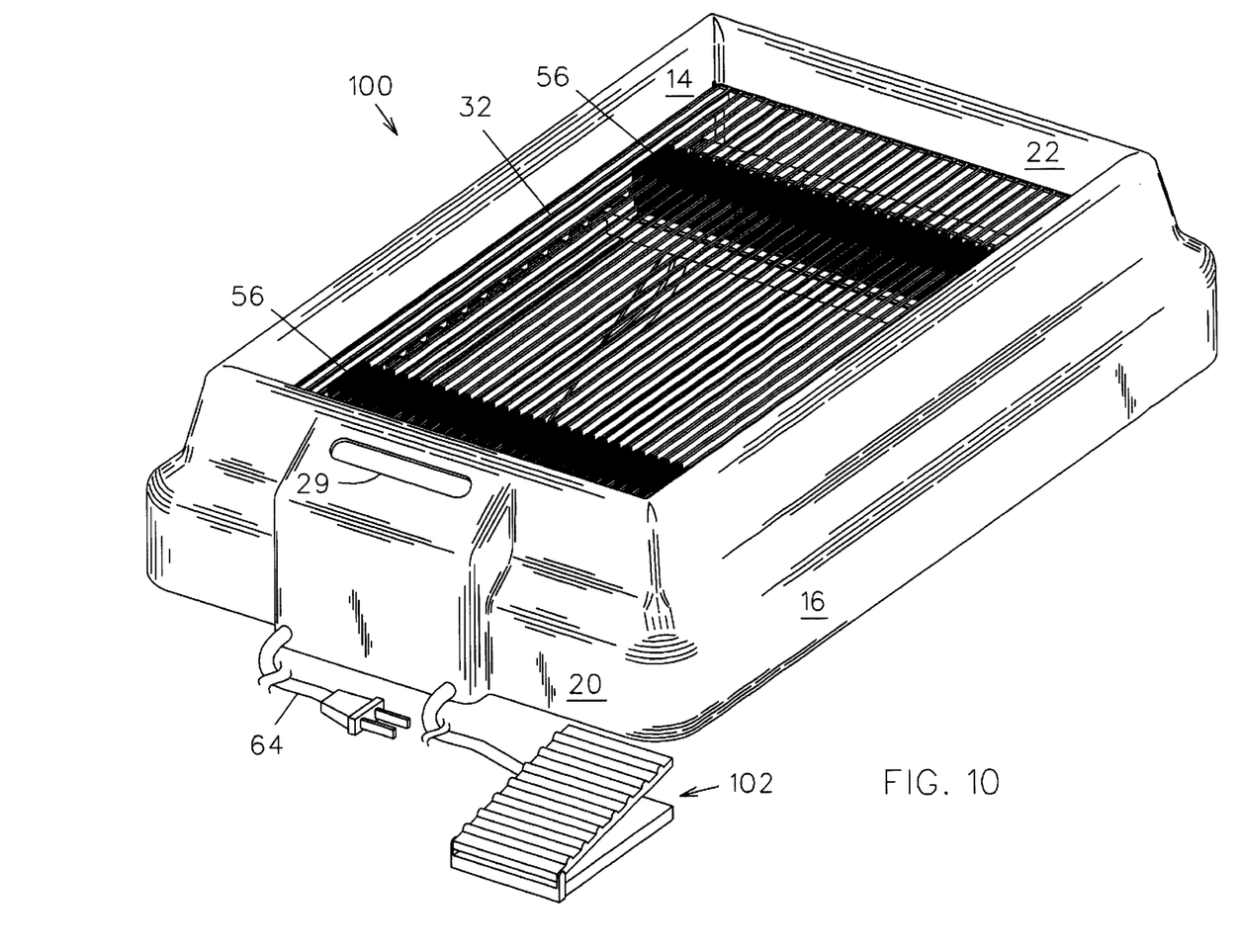
FIG. 10 is a perspective view of another embodiment of the apparatus having a foot peddle actuator.

Still another embodiment 100 of the invention is shown in FIG. 10 and has a construction that is substantially similar to the embodiment first described above except as particularly noted below. This embodiment includes a foot peddle actuator 102 electrically connected to the vibration device 60 for actuation thereof when the peddle is operated. The foot peddle actuator 102 replaces the on/off switch 66.

Figure 11:
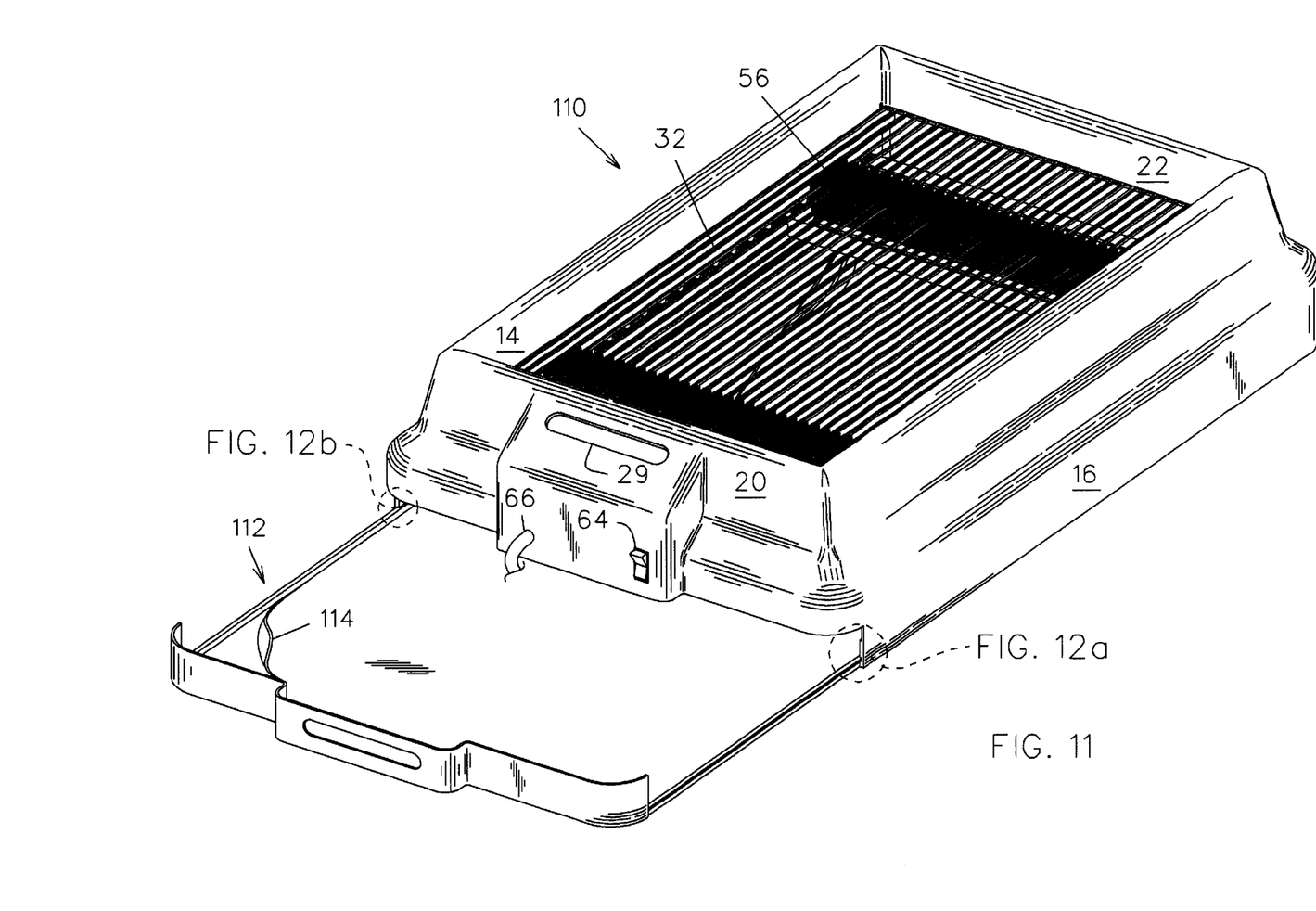
FIG. 11 is a perspective view of still another embodiment of the apparatus having a slidable tray.
Figure 12A:
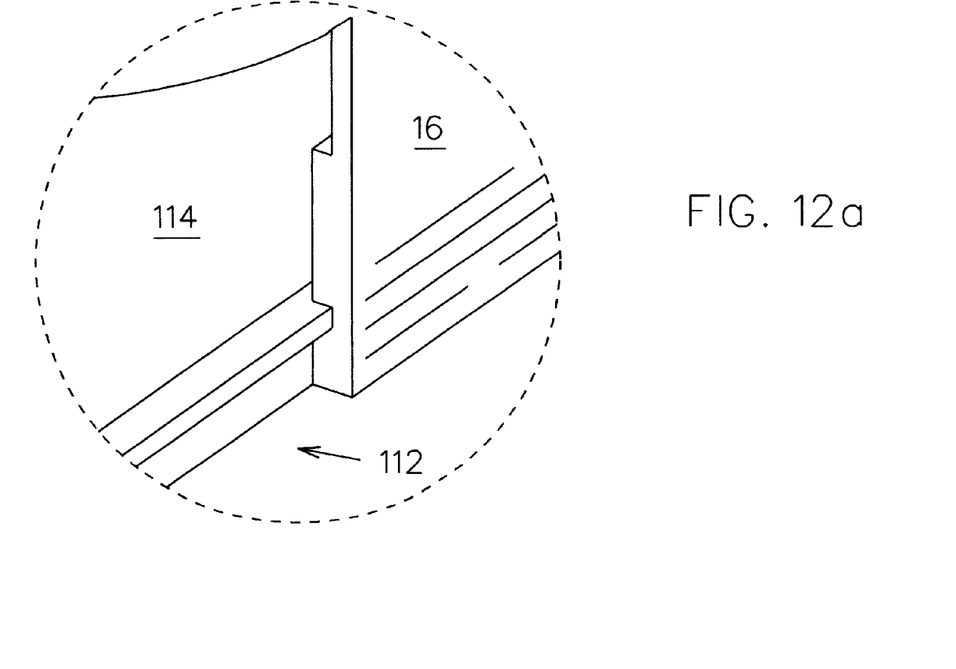
FIG. 12a is a perspective view on an enlarged scale of tray attachment means as in FIG. 11.
Figure 12B:
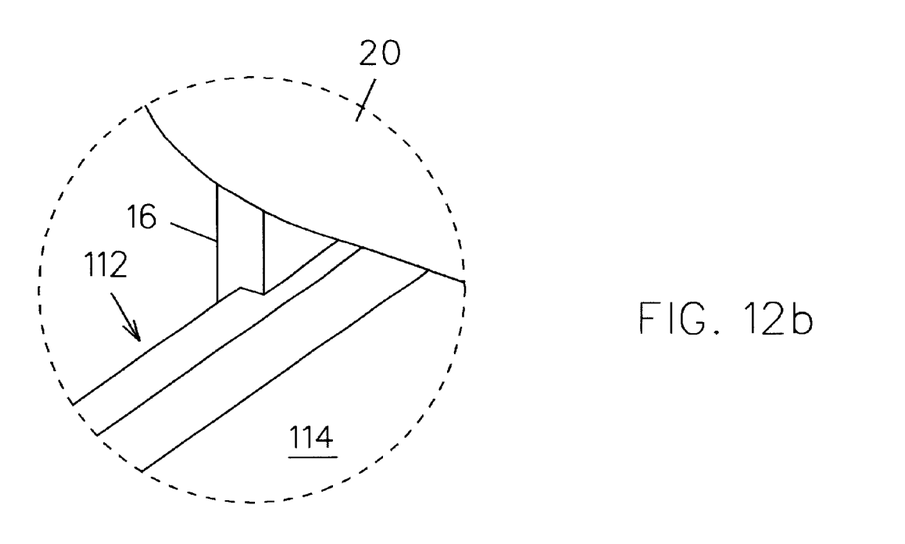
FIG. 12b is another perspective view on an enlarged scale of tray attachment means as in FIG. 11.

Yet another embodiment 110 of the invention is shown in FIGS. 11 through 12b and has a construction that is substantially similar to the embodiment first described above except as particularly noted below. This embodiment includes a tray 112 slidably coupled to the lower edges of the outer side walls and movable between a closed configuration adjacent the inner bottom wall 28 and an open configuration generally longitudinally spaced from the first outer end wall 20. In its closed configuration, the tray 112 serves as the outer bottom wall. A moisture absorbent material 114 is adhered to an upper surface of the tray 112 such that the paws of an animal may be dried by positioning the animal thereon following use of the apparatus. The lower edges of the tray 112 and outer side walls 16 are configured to mate together in a slidable relationship (FIGS. 12a and 12b). It should be understood that the lower edges of the outer side walls or the outer bottom wall may include gripping members to enhance the stability of the construction.

In still another embodiment (not shown), a single, high-output water pump could be used instead of two pumps as previously disclosed. The single output water pump would divert water through an impeller and gears so as to reciprocate the brushes back and forth. The water would then be directed to the brush heads and, therefore, against the paws of an animal positioned thereon. This embodiment eliminates the need for two motors and thus is more cost-effective.

Still another embodiment of this invention is to utilize a foot peddle coupled to the brush assemblies for reciprocating the brush assemblies upon repeated actuation of the peddle by a user's foot. In this embodiment, therefore, no motors are required.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A paw cleaning apparatus for use in cleaning the paws of an animal, comprising:
   a basin for receiving and holding a predetermined amount of a liquid, where said liquid is used to clean the paws of an animal, said basin having an inclined inner bottom wall with first and second opposed inner end walls and a pair of opposed side walls extending upwardly from said inner bottom wall, said basin including first and second outer end walls connected to said first and second inner end walls, respectively, so as to form an interior space therebetween;
   a grate removably mounted to said basin and spanning between said side and inner end walls, said grate being spaced from said inner bottom wall and adapted to support an animal thereon;
   a support rack having a pair of arms slidably coupled to respective side walls of said basin and extending longitudinally therealong, said support rack being positioned intermediate said inner bottom wall and said grate;
   a brush assembly having a brush head coupled to said rack arms and extending transversely therebetween, said brush assembly including a plurality of bristles extending upwardly from said brush head and through said grate; and
   a vibration device mounted within said interior space between said first inner and outer end walls and adapted to be connected to an electrical power source, said vibration device having a piston member extending through said first inner end wall and coupled to said rack and adapted to reciprocate said rack and brush assembly when energized so as to clean the paws of an animal positioned on said brush.

2. The paw cleaning apparatus as in claim 1, further comprising:
   a pair of first ledge portions fixedly attached to inner surfaces of respective side walls and extending longitudinally therealong for supporting said grate thereon, said first ledge portions being equally spaced from said inner bottom wall of said basin;
   a pair of second ledge portions fixedly attached to said inner surfaces of said respective side walls and extending longitudinally therealong for supporting said rack, said second ledge portions being positioned intermediate said inner bottom wall and said first ledge portions.

3. The paw cleaning apparatus as in claim 2 wherein:
   each second ledge portion defines a slot extending longitudinally therealong;
   each rack arm includes an outwardly extending flange extending longitudinally along an outer surface thereof adapted to slidably mate with a respective slot; and
   a plurality of wheels axially mounted to respective outer surfaces of said rack arms, said wheels adapted to rest atop respective second ledge portions, whereby said rack slidably reciprocates along said second ledge portions when said vibration device is energized.

4. The paw cleaning apparatus as in claim 1 further comprising a tube extending through said second inner and outer end walls, said tube including valve means for selectively delivering said liquid to said basin and draining said liquid therefrom.

5. The paw cleaning apparatus as in claim 1 further comprising:
   a water pump mounted within said interior space between said second inner and outer end walls and adapted to be connected to an electrical power source;
   an inlet tube having a first end connected to said water pump and defining an open second end positioned adjacent said inner bottom wall, said water pump adapted to suction said liquid held in said basin through said inlet tube and into said water pump when said water pump is energized; and
   an outlet tube having a first end connected to said water pump and having a second end removably coupled to said brush head, said water pump adapted to propel said suctioned liquid from said water pump to said brush head through said outlet tube when said water pump is energized so as to direct said suctioned liquid onto the paws of an animal positioned on said brush head.

6. The paw cleaning apparatus as in claim 5 wherein said inlet tube includes a filter removably coupled to said second end thereof for removing impurities from said suctioned liquid.

7. The paw cleaning apparatus as in claim 1 wherein said first and second outer end walls define handle slots so that said basin is portable and may be carried to a desired cleaning location.

8. The paw cleaning apparatus as in claim 1 further comprising:
   an air pump mounted within said interior space between said second inner and outer end walls and adapted to be connected to an electrical power source; and
   an air tube connecting said air pump and said brush head and adapted to direct a high velocity air stream through said brush head for cleaning the paws of an animal positioned on said brush head.

9. The paw cleaning apparatus as in claim 1 further comprising a foot peddle electrically connected to said vibration device for selectably actuating said vibration device upon a depression thereof.

10. The paw cleaning apparatus as in claim 1 further comprising a tray slidably coupled to bottom edges of said side walls and movable between a first configuration adjacent said inner bottom wall and a second configuration spaced from said inner bottom wall, said tray having a layer of absorbent material adhered to a top surface thereof so as to dry the paws of an animal positioned thereon.

11. A paw cleaning apparatus for use in cleaning the paws of an animal, comprising:
   a basin for receiving and holding a predetermined amount of a cleaning liquid, said basin having an inclined inner bottom wall with first and second opposed inner end walls and a pair of opposed inclined side walls extending upwardly from said inner bottom wall, said basin including first and second outer end walls connected to said first and second inner end walls, respectively, so as to form an interior space therebetween;
   a grate removably mounted to said basin and spanning between said side and inner end walls, said grate being positioned above said inner bottom wall and adapted to support an animal thereon;
   a support rack having a pair of arms slidably coupled to respective side walls of said basin and extending longitudinally therealong, said support rack being positioned intermediate said inner bottom wall and said grate;
   a pair of brush assemblies coupled to said support rack, each brush assembly having a brush head removably coupled to said rack arms at selectable positions therealong and extending transversely therebetween, each brush assembly including a plurality of bristles extending upwardly from a respective brush head and through said grate;
   a vibration device mounted within said interior space between said first inner and outer end walls and adapted to be connected to an electrical power source, said vibration device having a piston member extending through said first inner end wall and coupled to said rack and adapted to reciprocate said rack and brush assembly when energized so as to clean the paws of an animal positioned on said brush head;
   means for propelling said cleaning liquid in said basin through said respective brush heads so as to clean the paws of an animal positioned on said brush head.

12. The paw cleaning apparatus as in claim 11 wherein said propelling means comprises:
   a water pump mounted within said interior space between said second inner and outer end walls and adapted to be electrically connected to an electrical power source;
   an inlet tube having a first end connected to said water pump and defining an open second end positioned adjacent said inner bottom wall, said water pump adapted to vacuum said cleaning liquid held in said basin through said inlet tube and into said water pump when said water pump is energized; and
   an outlet tube having a first end connected to said water pump and having a pair of outlet ends removably coupled to said respective brush heads, said water pump adapted to propel said vacuumed liquid from said water pump through said outlet tube to said respective brush heads when said water pump is energized so as to direct said vacuumed cleaning liquid onto the paws of an animal positioned on said respective brush heads.

13. The paw cleaning apparatus as in claim 12 wherein said inlet tube includes a filter removably coupled to said second end thereof.

14. The paw cleaning apparatus as in claim 11 further comprising:
   a pair of first ledge portions fixedly attached to inner surfaces of respective side walls and extending longitudinally therealong for supporting said grate thereon, said first ledge portions being equally spaced above said inner bottom wall of said basin; and
   a pair of second ledge portions fixedly attached to said inner surfaces of said respective side walls and extending longitudinally therealong for supporting said rack, said second ledge portions being positioned intermediate said inner bottom wall and said first ledge portions.

15. The paw cleaning apparatus as in claim 14 wherein:
   each second ledge portion defines a slot extending longitudinally therealong;
   each rack arm includes an outwardly extending flange extending longitudinally therealong adapted to slidably mate with a respective slot; and
   a plurality of wheels axially mounted to respective rack arms and longitudinally spaced from one another therealong, said wheels adapted to rest atop respective second ledge portions, whereby said rack slidably reciprocates along said second ledge portions when said vibration device is energized.

16. The paw cleaning apparatus as in claim 11 further comprising a tube extending through said second inner and outer end walls, said tube including valve means for selectively delivering said cleaning liquid to said basin and draining said cleaning liquid therefrom.

17. The paw cleaning apparatus as in claim 11 wherein said first and second outer end walls define handle slots so that said basin is portable and may be carried to a desired cleaning location.

18. The paw cleaning apparatus as in claim 11 further comprising a foot peddle electrically connected to said vibration device for selectably actuating said vibration device upon a depression thereof.

19. The paw cleaning apparatus as in claim 11 further comprising a tray slidably coupled to bottom edges of said side walls and movable between a first configuration adjacent said inner bottom wall and a second configuration spaced from said inner bottom wall, said tray having a layer of absorbent material adhered to a top surface thereof so as to dry the paws of an animal positioned thereon.

20. The paw cleaning apparatus as in claim 11 wherein each brush head defines multiple orifices through which said vacuumed cleaning liquid is discharged for uniformly cleaning a paw of an animal positioned on a respective brush head.

* * * * *